United States Patent [19]

Tsubouchi et al.

[11] Patent Number: 5,747,112
[45] Date of Patent: *May 5, 1998

[54] PROCESS FOR THE PRODUCTION OF HEAT- AND CORROSION-RESISTANT POROUS METAL BODY

[75] Inventors: Toshiyasu Tsubouchi; Satoru Okamoto; Tomohiko Ihara, all of Itami, Japan

[73] Assignee: Sumitomo Electric Industries, Ltd., Japan

[*] Notice: The term of this patent shall not extend beyond the expiration date of Pat. No. 5,672,387.

[21] Appl. No.: 706,739

[22] Filed: Sep. 9, 1996

Related U.S. Application Data

[63] Continuation-in-part of Ser. No. 491,416, Jun. 16, 1995, Pat. No. 5,672,387.

[30] Foreign Application Priority Data

Aug. 12, 1994 [JP] Japan .................... 6-190424
Dec. 28, 1994 [JP] Japan .................... 6-327996

[51] Int. Cl.⁶ .................................................. B01D 53/00
[52] U.S. Cl. ............................................................ 427/253
[58] Field of Search .................................................. 427/253

[56] References Cited

U.S. PATENT DOCUMENTS 4,132,816  1/1979  Benden ................... 427/253
5,672,387  9/1997  Tsubouchi ................ 427/253

Primary Examiner—Sam Silverberg
Attorney, Agent, or Firm—Bierman, Muserlian and Lucas

[57] ABSTRACT

A process for the production of a heat- and corrosion-resistant porous metal body which is made of a metal or whose surface layer is made of a metal, in which the porous metal body can be alloyed with chromium or a combination of chromium and aluminum uniformly throughout the entire thereof by adjusting the alloy composition in the following manner, i.e., (A) heat-treating the porous metal body in a mixed gas comprising a gas, generated by heating a powdered mixture comprising chromium or its compound and $NH_4Cl$ at 950° to 1100° C., and a diluent reducing gas at 800° to 1100° C., or (B) heat-treating the porous metal body in a mixed gas comprising a gas, generated by heating a powdered mixture comprising aluminum or its compound, chromium or its compound and $NH_4X$, wherein X is I, F, Cl or Br, at a weight ratio of the chromium or its compound to the aluminum or its compound of 10 to 80 in terms of Cr and Al respectively at 950° to 1100° C., and a diluent reducing gas at 800° to 1100° C.

5 Claims, 2 Drawing Sheets

ONE HEAT CYCLE RUN

TWO HEAT CYCLE RUNS

THREE HEAT CYCLE RUNS

PROCESS FOR THE PRODUCTION OF HEAT- AND CORROSION-RESISTANT POROUS METAL BODY

PRIOR APPLICATION

This application is a continuation-in-part of U.S. patent application Ser. No. 08/491,416 filed Jun. 16, 1995, now U.S. Pat. No. 5,672,387.

BACKGROUND OF THE INVENTION

1. Field of the Invention

The present invention relates to a process for the production of a heat- and corrosion-resistant porous metal body which has continuous pores and which is utilizable as various filters and catalyst supports, particularly those improved in the resistances to corrosion and heat.

2. Description of the Prior Art

There have been known two types of processes for producing a porous metal body having fine continuous pores, i.e., (1) one described in Japanese Patent Laid-Open Nos. 255686/1989 and 81767/1988 which comprises making a metal deposit by electroplating on a conductive nonwoven fabric or a nonwoven fabric or three-dimensional network structure to which electrical conductivity has been imparted by some treatment, removing the core material of the nonwoven fabric or the like by heat treatment, and densifying the resulting metal texture and which is employed in, e.g., the production of a porous pure nickel body useful as a material of an electrode for a battery; and (2) one described in Japanese Patent Publication Nos. 13077/1967 and 42703/1979 which comprises forming metal fibers made by drawing, cutting or the like, into a nonwoven-fabric-like structure and sintering the structure and which is employed in, e.g., the production of a porous stainless steel body useful as various filters. The first type of processes (1) are disadvantageous in that the metal species which can be deposited by electroplating are limited. Therefore, the processes fail in making a porous metal body of Ni—Cr—Al alloy having superior corrosion resistance and heat resistance, as proposed by the applicant of the present invention (in Japanese Patent Laid-Open No. 206255/1993) or a porous metal body of Fe—Cr—Al alloy which has been studied as a support material for the catalyst for treating the exhaust gas from a gasoline automobile, so that any porous metal body having heat resistance enough to withstand a temperature of as high as 500° to 600° C. and high corrosion resistance cannot be obtained by the processes. The second type of processes (2) also fail in obtaining a porous metal body having heat resistance enough to withstand a temperature of as high as 500° to 800° C. and high corrosion resistance, because it is impossible owing to the restrictions in the technique for making metal fibers of an Ni—Cr—Al or Fe—Cr—Al alloy.

In order to overcome the disadvantages of the above two types of processes, attempts have been made to employ a process for adjusting the composition of an alloy with a powdered material, which has been known as a technique for anticorrosion coating of automobiles or the like and is called "diffusion coating", simultaneously with the above process. This process is one which comprises heat-treating a porous metal body at 900° to 1100° C. in a state buried in powders comprising aluminum, chromium and ammonium chloride and by which both aluminum and chromium are deposited on the surface of the body and diffused into the body to attain an alloy composition satisfying the requirements of high heat and corrosion resistances. Such a technique is generally called "chromium-aluminizing". Further, when chromium and ammonium chloride are used as the above-mentioned powders, the technique is called "chromizing". However, the conventional techniques have a problem that part of the starting powdered material remains in a state adherent to the surface of a filter or in a state sintered on the surface thereof, which is causative of clogging the filter to lower the performance of the filter. Therefore, there has been studied a process for preventing the retention of a powdered material on a filter by using the powdered material as a gas source and separating the filter from the powdered material. A filter generally has a complicated shape. On the other hand, a nickel or iron alloy is deteriorated in toughness to result in poor workability when an alloying amount with aluminum is increased, though aluminum is a component effective in improving the heat resistance. Accordingly, a porous nickel or iron metal body itself must be preformed into a predetermined shape and thereafter adjusted so as to finally attain a desired alloy composition. Therefore, depending on the shape of the porous metal body, it is necessary to use a technique by which both chromium and aluminum can be uniformly diffused and permeated into the porous metal body placed 10 to 20 cm apart from the powdered material. However, an excess of aluminum tends to deposit on the metal body owing to the vapor pressure of chromium lower than that of aluminum. Especially, when a porous metal body having a size of as large as 10 to 20 cm was subjected to the chromium-aluminizing, the aluminum alloying content increased as the distance from the gas source of the powdered material increased, so that in some portion the aluminum alloying content was higher than 10 times that of the portion near the powder to be diffused. On the contrary, the chromium content decreased as the distance from the gas source of the powdered material increased, so that in some portion the chromium content was lower than one-tenth of that of the portion near the powder to be diffused. The portion thus formed having a higher aluminum alloying content exhibited poor toughness, so that the resulting body exhibited poor workability into a final shape and poor antivibration properties.

As described above, the diffusion coating of a porous metal body for imparting heat and corrosion resistances thereto according to the chromium-aluminizing of the prior art had a problem that the resulting alloyed body was poor in toughness owing to its uneven distributions of aluminum and chromium contents in the body. In particular, when a porous metal body having a size of as large as 10 to 20 cm was alloyed with both aluminum and chromium by gas diffusion coating using a conventional powdered material comprising aluminum and chromium, there occurred a problem that an excess of aluminum deposited on some portion of the body locally, so that the aluminum content in the portion distant from the powdered material as the gas source became uneven, thereby resulting in a poor toughness.

SUMMARY OF THE INVENTION

The present invention has been made in view of the above problems of the prior art and aims at providing a process for producing a heat- and corrosion-resistant porous metal body which enables uniform alloying of a porous metal body with chromium alone or both aluminum and chromium.

The inventors of the present invention have made intensive studies and have found that the foregoing problem could be eliminated by improving the heat treatment of the diffusion coating. The present invention has been accomplished on the basis of this finding.

Namely, the present invention provides a process for the production of a heat- and corrosion-resistant porous metal body, which comprises adjusting an alloy composition of a porous metal body which is made of a metal or whose surface layer is made of a metal, in which the alloy composition is adjusted by:

(A) heat-treating the porous metal body in a mixed gas comprising a gas, generated by heating a powdered material comprising chromium or its compound and NH₄Cl at 950° to 1100° C., and a reducing diluent gas at 800° to 1100° C., or (B) heat-treating the porous metal body in a mixed gas comprising a gas, generated by heating a powdered material comprising aluminum or its compound, chromium or its compound and NH₄X, wherein X is I, F, Cl or Br, at a mixing weight ratio (Cr/Al) of the chromium or its compound to the aluminum or its compound of 10 to 80 in terms of Cr and Al respectively at 950° to 1100° C., and a reducing diluent gas, at 800° to 1100° C.

DETAILED DESCRIPTION OF THE PREFERRED EMBODIMENTS

Figure 1:
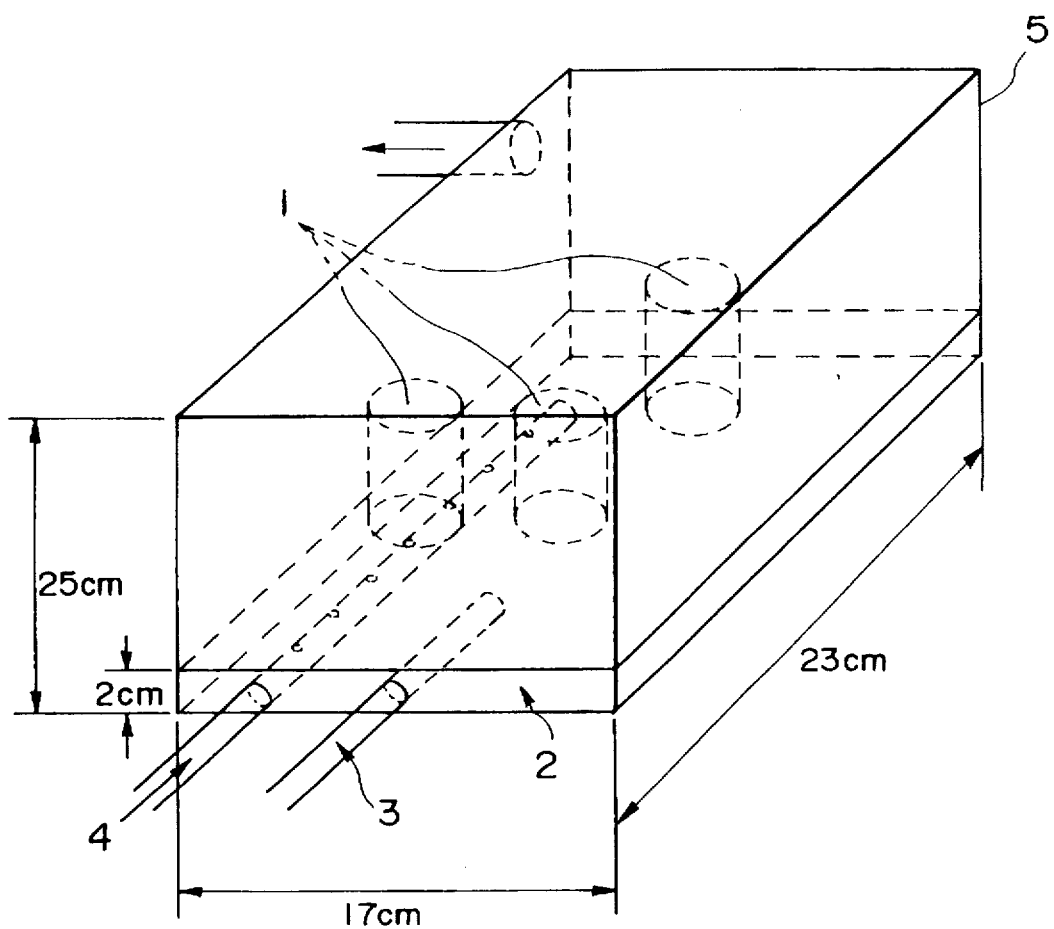
FIG. 1 is a schematic view of the heat treatment apparatus used for diffusion coating in Examples.

The porous metal body to be subjected to the above heat treatment according to the present invention may be constituted of iron, nickel, cobalt, an alloy based on one or more of them, or the like.

The powdered material to be used as the gas source in the present invention may be any known one used in the chromium-aluminizing according to diffusion coating. In other words, as the powdered material, there may be used aluminum and chromium or an aluminum compound, e.g. aluminum halide (such as $AlF_3$, $AlCl_3$, $AlBr_3$ or $AlI_3$) and a chromium compound, e.g., chromium halide (such as $CrF_2$, $CrCl_2$, $CrBr_2$ or $CrI_2$), and a halide activator (NH₄X, wherein X is I, F, Cl or Br). Further, alumina or the like may be added for the purpose of preventing the sintering of powder particles with each other when the powdered material is heated. When alumina is used in the powdered material for this purpose, the aluminum content of this alumina is excluded from the foregoing mixing weight ratio (Cr/Al) because the alumina is not a source component for alloying.

According to the present invention, a reducing gas such as hydrogen or a mixture thereof with an inert gas such as argon or neon is preferably used as a diluent gas with which a gas generated by heating the above powdered material at 950° to 1100° C. is diluted. In particular, a reducing gas such as hydrogen can form a reducing atmosphere, which is effective in preventing the initial thermal oxidation of a metal which hinders the alloying of a porous metal body with chromium and aluminum. Therefore, it is preferable that the gas mixture contain a reducing gas such as hydrogen in an amount of at least 60% by volume, still preferably at least 80% by volume. The reducing diluent gas is preferably introduced into the heat treatment zone and mixed therein with a gas generated by heating the above powdered material to adjust the concentrations of aluminum and chromium or those of aluminum compound and chromium compound to desired values through dilution. The adjustment of the concentration of aluminum and chromium with a diluent gas is effective in uniforming the concentrations of the reactants, i.e., aluminum and chromium, throughout the treatment atmosphere gas as completely as possible.

In the diffusion coating of the prior art wherein a powdered material comprising the components to be diffused into a porous metal body is used as the gas source, the chromium concentration rapidly lowers as the distance from the powdered material increases, owing to the vapor pressure of chromium lower than that of aluminum. Therefore, the portion of a porous metal body distant from the powdered material is alloyed with an excess of aluminum to result in poor toughness, not satisfying the requirements of excellent workability into a desired shape and antivibration properties. According to the present invention, the pressure of the aluminum vapor generating from the starting powdered material is lowered to thereby increase the pressure of chromium vapor relatively to that of aluminum vapor, by which the deposition of an excess of aluminum on a porous metal body is inhibited. Further, as described above, the concentrations of aluminum and chromium are highly uniformed by mixing the gas generated from the powdered material with a diluent gas. It is desirable that the powdered material contain aluminum (or an aluminum compound) and chromium (or a chromium compound) at a Cr/Al mixing ratio (by weight) of the chromium (or its compound) to the aluminum (or its compound) of 10 to 80, more desirably 15 to 70 (in terms of Cr and Al). The heat treatment for diffusion coating is preferably conducted at 800° to 1100° C. for 3 to 8 hours.

According to the present invention, as described above, the Cr/Al mixing ratio of the powdered material is enhanced and the component gases to be diffused are mixed with a reducing diluent gas, by which the aluminum component is suppressed and the concentration of chromium in the atmosphere gas is adjusted so as to be uniform throughout the entire heat treating zone. In order to adjust the concentration of this component gas of chromium or a chromium compound to be diffused to a more suitable value to thereby uniform the chromium content of the alloy formed on the surface of a porous metal body more completely, it is preferable that the reducing gas be used in an amount of 0.01 to 0.06 mol/min per 1 kg of the chromium or its compound powder in terms of Cr and the chromium or chromium compound in the powdered material as the gas source be in an amount of 15 to 35% by weight, still preferably 20 to 35% by weight (in terms of Cr) based on the whole powdered material, with the proviso that the Cr/Al ratio of the powdered material lies within the above range. When the amount of the reducing gas is less than 0.01 mol/min, the concentration of a more reactive species, i.e., a component gas of aluminum (or an aluminum compound) in the treatment atmosphere gas will increase to alloy a porous metal body with too much aluminum, which will lead to the production of a porous metal body having a nonuniform composition and poor toughness. On the contrary, when the amount of the reducing gas exceeds 0.06 mol/min, the chromium concentration will be too low to alloy a porous metal body with enough chromium, so that the resulting body will not be sufficiently improved in heat and corrosion resistances, though the concentration of aluminum or an aluminum compound gas is suppressed. When chromium or a chromium compound is in an amount of less than 15% by weight (in terms of Cr) based on the whole powdered material, the concentration of chromium or a chromium compound in the treatment atmosphere gas will be too low to give a porous metal body alloyed with a sufficient amount of chromium, while when the content as Cr exceeds 35% by weight, the concentration of chromium or its chromium compound gas in the atmosphere gas near the powder as the gas source will be too high to obtain a porous metal body having a uniform alloy composition. Thus, both cases are unfavorable.

In the preferred embodiment of this invention, the above heat-treating step for the adjustment of the composition of the formed alloy may be performed by repeating a cycle comprising temperature rise and temperature fall. In such a manner, the chromium content can be sufficiently compensated. The inventors of the present invention have directed their attention to the fact that chromium deposits from a gas supersaturated with chromium vapor by temperature fall, and have attained the accelerated deposition of chromium by repeating the temperature fall.

The temperature fall need not be one reaching room temperature as shown in FIG. 2 (a), but may be performed in a heat cycle pattern comprising fall to a certain temperature and re-rise to the treatment temperature as shown in FIG. 2 (b). The temperature fall is preferably carried out to reach a range of 800°–900° C. As properties required for use in a filter, the chromium content may lie within such a range that the heat and corrosion resistances are not be deteriorated, preferably ranges from 15 to 35% by weight.

It is preferable from the standpoint of industrial productivity that the frequency of such a heat cycle be as small as possible, because a higher frequency of the heat cycle leads to a lower efficiency and a higher treatment cost. The frequency thereof to attain the lowest necessary chromium content is preferably 2 or 3. As described above, the process of the present invention makes it possible to provide a uniform chromium content even in the internal region of a porous metal body in its thicknesswise direction by repeating the heat cycle to thereby positively utilize the phenomenon that chromium deposits by the temperature fall. Further, according to the present invention, the contents of aluminum and chromium in the resulting alloyed body can be adjusted by single heat treatment. Since this technique makes it possible to provide a uniform composition of aluminum and chromium to a porous metal body, which has been formed into a desired shape, in the thickness direction of the body, the thus treated porous metal body has heat and corrosion resistances even in the inner area. Consequently, the metal body can exhibit heat resistance and corrosion resistance at 700° C. or higher.

The process of the present invention can be applied to chromizing using only a chromium component without any aluminum component and this is also included within the present invention. In this case, the heat-treatment for diffusion coating is carried out preferably at 950° to 1100° C. for 3 to 8 hours.

In the chromizing process, the amount of a reducing gas such as hydrogen is preferably 0.01 to 0.06 mol/min per 1 kg of the chromium or chromium compound in terms of Cr, while the chromium or its compound as the gas source is preferably in an amount of 15 to 35% by weight, still preferably 20 to 35% by weight in terms of Cr based on the whole powdered material. When the amount of the reducing gas is less than 0.01 mol/min, the concentration of the gas of chromium or its chromium compound in the treatment atmosphere gas will be so nonuniform as to give a porous metal body having a nonuniform composition unfavorably. On the contrary, when the amount of the reducing gas exceeds 0.06 mol/min, the concentration of the gas of chromium or its chromium compound will be too low to give a porous metal body with a sufficient amount of chromium, so that the resulting body will not sufficiently be improved in heat and corrosion resistances. Further, when the content, in terms of Cr, of chromium or chromium compound powder is less than 15% by weight, the concentration of chromium or its chromium compound in the treatment atmosphere gas will be too low to give a porous metal body with a sufficient amount of chromium, while when the content, in terms of Cr, of powdered chromium or its compound exceeds 35% by weight, the concentration of the gas of chromium or its chromium compound in the atmosphere gas near the gas source will be too high. Both cases are unfavorable. In this chromizing process, the above heat-treating step for the adjustment of the composition of the formed alloy may be performed by repeating a cycle comprising temperature rise and temperature fall. In such a manner, the chromium content can be sufficiently compensated. The foregoing amount (0.01 to 0.06 mol/min) of the reducing gas per 1 kg (in terms of Cr) of the chromium or its compound used in the chromium-aluminizing or chromizing is the amount for the reducing gas such as hydrogen excluding an inert gas which may be included in the reducing diluent gas.

According to the present invention, a porous metal body can be alloyed with both aluminum and chromium uniformly in a wide region to give a porous metal body exhibiting a heat resistance enough to withstand a temperature of as high as 500° C. or above and a high corrosion resistance, even when it is a filter having a complicated shape and a size of as large as 10 to 20 cm or above.

The processes of the present invention are applicable not only to a filter but also to a support for active components such as catalysts which are required to be resistant to heat and corrosion.

This invention will be illustrated in more detail by the following examples.

EXAMPLES 1–9

A porous metal body (trade name: CELMET, nickel-base porous body of three-dimensional network structure, a product of Sumitomo Electric Industries, Ltd.) made by metallizing polyurethane by plating and having a skeleton size of 60 μm, a pore diameter of 0.7 mm, a packing density of 5% and a thickness of 1.8 mm was obtained. The thus obtained porous metal bodies were wound around a cylindrical core to form five-ply cylindrical porous bodies. Each body was uniformly pressed into a cylindrical sample having an inner diameter of 3 cm, an outer diameter of 4.2 cm and a height of 20 cm. As shown in FIG. 1, each sample 1 was put on a powdered material 2 including Cr, Al and $NH_4Cl$, based on the total weight of Cr, Al, $NH_4Cl$ and $Al_2O_3$, as shown in Table 1, and spread on the bottom of a furnace 5 (width: 17 cm, length: 23 cm, height: 25 cm) in a depth of about 2 cm. The powdered material 2 was a source for supplying component gases to be diffused into and alloyed with the porous metal body and is hereinafter referred to as "diffusion gas source powdered material". Chromium-aluminizing was conducted in a gaseous atmosphere at 1050° C. for 5 hours. In FIG. 1, reference numerals 3 and 4 represent a terminal of a temperature control rod and a reducing diluent gas, respectively. The numerical values indicated within ( ) after the flow rates of $H_2$ in the column "Reducing diluent gas" of Table 1 are the flow rates (mol/min) of the reducing gas ($H_2$) per 1 kg of Cr in the powdered material. Similarly to Table 1, the flow rates of the reducing gas in the following Examples are also shown in the respective tables.

Thereafter, the thus treated samples were taken out of the furnace and cut in square specimens (1 cm×1 cm). Each square specimen was peeled off, and analyzed for composition of the porous metal body alloyed with Al and Cr by ionization absorption spectrophotometry. Further, each sample treated by chromium-aluminizing was further subjected to heat resistance test. In this test, the heat resistance of the alloyed sample was evaluated by oxidizing the sample in the open air at 800° C. for 50 hours to determine the weight gain thereof. A case wherein the weight gain was up to 10% was judged good.

Furthermore, the alloyed sample was subjected to workability test. In this test, a case wherein the sample did not break even when bent rectangularly three or more times was judged good. An overall judgment was conducted based on the results of both items. The results are given in Table 1. In the following tables, satisfactory results are marked with circle (o) and unacceptable results are marked with cross (x). Further, "Workability" is shown the frequency of bending until breakage occurred in the porous metal body.

TABLE 1

| Ex. No. | Composition (wt. %) | | Composition of powdered material (wt. %)* | | | Cr/Al | Reducing diluent gas (cc/min) | | (mol/min) | Heat cycle | Distance from source material (cm) |
|---|---|---|---|---|---|---|---|---|---|---|---|
| | Ni | Fe | Cr | Al | NH₄Cl | | Ar | H₂ | | | |
| 1 | 100 | — | 25 | 0.5 | 0.5 | 50 | — | 200 | (0.027) | 1 | 0 |
| 2 | 100 | — | 25 | 0.5 | 0.5 | 50 | — | 200 | (0.027) | 1 | 10 |
| 3 | 100 | — | 25 | 0.5 | 0.5 | 50 | — | 200 | (0.027) | 1 | 20 |
| 4 | 100 | — | 25 | 1.5 | 0.5 | 16.7 | — | 200 | (0.027) | 1 | 0 |
| 5 | 100 | — | 25 | 1.5 | 0.5 | 16.7 | — | 200 | (0.027) | 1 | 10 |
| 6 | 100 | — | 25 | 1.5 | 0.5 | 16.7 | — | 200 | (0.027) | 1 | 20 |
| 7 | 100 | — | 35 | 0.5 | 0.5 | 70 | — | 200 | (0.019) | 1 | 0 |
| 8 | 100 | — | 35 | 0.5 | 0.5 | 70 | — | 200 | (0.019) | 1 | 10 |
| 9 | 100 | — | 35 | 0.5 | 0.5 | 70 | — | 200 | (0.019) | 1 | 20 |

| Ex. No. | Composition after alloying (wt. %) | | | | Heat resistance (weight gain) (%) | Workability (frequency of bending) | Overall judgment |
|---|---|---|---|---|---|---|---|
| | Ni | Fe | Cr | Al | | | |
| 1 | bal | — | 22 | 6 | 3 | 5 | o |
| 2 | bal | — | 23 | 5 | 4 | 5 | o |
| 3 | bal | — | 25 | 5 | 4 | 5 | o |
| 4 | bal | — | 17 | 8 | 7 | 3 | o |
| 5 | bal | — | 17 | 7 | 7 | 3 | o |
| 6 | bal | — | 18 | 6 | 7 | 3 | o |
| 7 | bal | — | 25 | 5 | 8 | 6 | o |
| 8 | bal | — | 24 | 4 | 8 | 6 | o |
| 9 | bal | — | 25 | 4 | 8 | 6 | o |

*Remainder: Al₂O₃

COMPARATIVE EXAMPLES 1–3

The same treatments as that of Examples 1–3 were repeated except that the chromium concentration of the diffusion gas source powdered material was changed to 3% by weight and the flow rate (mol/min) of the reducing gas (H₂) per 1 kg of Cr was changed as shown in Table 2. The results are given in Table 2.

COMPARATIVE EXAMPLES 4–6

The same treatments as that of Examples 7–9 were repeated except that the chromium concentration of the diffusion gas source powdered material was changed to 50% by weight and the flow rate; (mol/min) of the reducing gas (H₂) per 1 kg of Cr was chanted as shown in Table 2. The results are given in Table 2.

TABLE 2

| Comp. Ex. No. | Composition (wt. %) | | Composition of powdered material (wt. %)* | | | Cr/Al | Reducing diluent gas (cc/min) | | (mol/min) | Heat cycle | Distance from source material (cm) |
|---|---|---|---|---|---|---|---|---|---|---|---|
| | Ni | Fe | Cr | Al | NH₄Cl | | Ar | H₂ | | | |
| 1 | 100 | — | 3 | 0.5 | 0.5 | 6 | — | 200 | (0.228) | 1 | 0 |
| 2 | 100 | — | 3 | 0.5 | 0.5 | 6 | — | 200 | (0.228) | 1 | 10 |
| 3 | 100 | — | 3 | 0.5 | 0.5 | 6 | — | 200 | (0.228) | 1 | 20 |
| 4 | 100 | — | 50 | 0.5 | 0.5 | 100 | — | 200 | (0.014) | 1 | 0 |
| 5 | 100 | — | 50 | 0.5 | 0.5 | 100 | — | 200 | (0.014) | 1 | 10 |
| 6 | 100 | — | 50 | 0.5 | 0.5 | 100 | — | 200 | (0.014) | 1 | 20 |

| Comp. Ex. No. | Composition after alloying (wt. %) | | | | Heat resistance (weight gain) (%) | Workability (frequency of bending) | Overall judgment |
|---|---|---|---|---|---|---|---|
| | Ni | Fe | Cr | Al | | | |
| 1 | bal | — | 2 | 12 | 8 | 1 | x |
| 2 | bal | — | 0.5 | 11 | 9 | 1 | x |
| 3 | bal | — | 0.1 | 11 | 10 | 1 | x |
| 4 | bal | — | 26 | 3 | 9 | 6 | x |
| 5 | bal | — | 27 | 1 | 11 | 7 | x |
| 6 | bal | — | 28 | 0.2 | 15 | 8 | x |

*Remainder: Al₂O₃

EXAMPLES 10–12

Nonwoven metal fabrics of Fe having a fiber diameter of 30 μm, packing density of 18% and a thickness of 0.7 mm were made by metallizing nonwoven fabrics made of organic fibers or carbon fibers with Fe by plating.

Each of the thus obtained nonwoven metal fabrics metallized with Fe by plating was wound around a cylindrical core to form a three-ply cylindrical porous body. Each body was uniformly pressed into a cylindrical sample having an inner diameter of 3 cm, an outer diameter of 3.3 cm and a height of 20 cm and subjected to chromium-aluminizing in the same manner as described in Examples 1–3. Each sample was put on a diffusion gas source powdered material including Cr, Al and $NH_4Cl$, based on the total weight of Cr, Al, $NH_4Cl$ and $Al_2O_3$, as shown in Table 3, and spread on the bottom of a furnace in a depth of about 2 cm. The chromium-aluminizing treatment was conducted in a gaseous atmosphere at 1050° C. for 3 hours. Thereafter, the thus treated nonwoven metal fabric was subjected to compositional analysis, heat resistance test and workability test, in the same testing procedures as described in Examples 1–3. The results are given in Table 3.

EXAMPLES 13–15

The same treatments as that of Examples 10–12 were repeated except that hydrogen gas and argon gas were introduced at rates of 240 cc/min and 60 cc/min, respectively, in place of the reducing diluent gas used in Examples 10–12 so that the flow rate (mol/min) of the reducing gas ($H_2$) per 1 kg of Cr was changed as shown in Table 3. The results are given in Table 3.

EXAMPLES 16–21

Figure 2A:
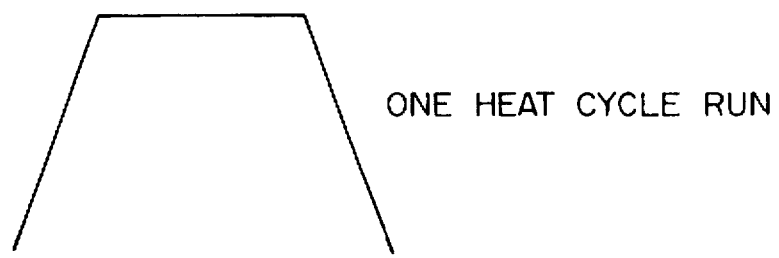
FIGS. 2a, 2b and 2c are explanation diagrams showing the heat cycle when a heat-up and cool-down cycle is repeated in the heat treatment according to the present invention.
Figure 2B:
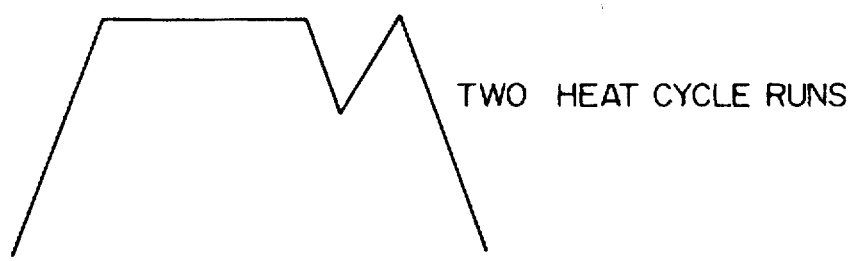
Figure 2C:
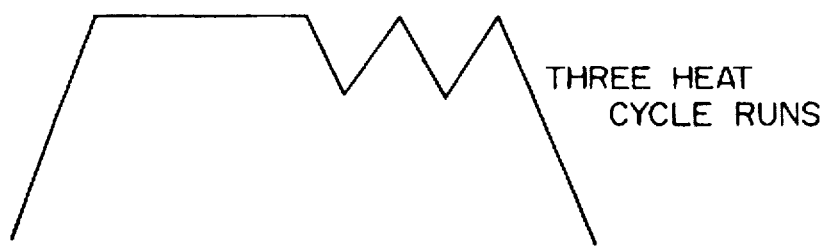

The same treatments as that of Examples 10–12 were repeated except that either one of two types of heat cycles as shown in FIG. 2(a) or FIG. 2(c) was conducted on nonwoven metal fabrics of nickel and further the aluminum content of the powdered material was changed as shown in Table 3. The results are given in Table 3.

The patterns of heat cycle used in Examples are shown in FIG. 2(a) to 2(c). More specifically, FIG. 2(a) shows a heat cycle comprising heating up from room temperature to the temperature predetermined for chromizing or chromium-aluminizing treatment and cooling down to room temperature after the treatment. FIGS. 2(b) and 2(c) show alternative heat cycle patterns in which a cycle of heating up and cooling down are repeated. For instance, in Example 10–12, as shown in FIG. 2(a), the nonwoven fabric was subjected to heating to 1050° C., chromium-aluminizing at that temperature for 3 hr., and then cooling to room temperature. In Example 16–18, as shown in FIG. 2(b), the nonwoven fabric was subjected to heating to 1050° C., chromium-aluminizing at that temperature for 3 hr., cooling to 800° C., reheating to 1050° C., and then cooling to room temperature. In Examples 19–21, as shown in FIG. 2(c), the nonwoven fabric was subjected to heating to 1050° C., chromium-aluminizing at that temperature for 3 hr., cooling to 800° C., reheating to 1050° C., then repeating the same cooling and heating cycle, and finally cooling to room temperature.

TABLE 3

| Ex. No. | Composition (wt. %) | | Composition of powdered material (wt. %)* | | | | Reducing diluent gas (cc/min) | | (mol/min) | Heat cycle | Distance from source material (cm) |
|---|---|---|---|---|---|---|---|---|---|---|---|
| | Ni | Fe | Cr | Al | $NH_4Cl$ | Cr/Al | Ar | $H_2$ | | | |
| 10 | — | 100 | 25 | 0.5 | 0.5 | 50 | — | 200 | (0.027) | 1 | 0 |
| 11 | — | 100 | 25 | 0.5 | 0.5 | 50 | — | 200 | (0.027) | 1 | 10 |
| 12 | — | 100 | 25 | 0.5 | 0.5 | 50 | — | 200 | (0.027) | 1 | 20 |
| 13 | — | 100 | 25 | 0.5 | 0.5 | 50 | 60 | 240 | (0.033) | 1 | 0 |
| 14 | — | 100 | 25 | 0.5 | 0.5 | 50 | 60 | 240 | (0.033) | 1 | 10 |
| 15 | — | 100 | 25 | 0.5 | 0.5 | 50 | 60 | 240 | (0.033) | 1 | 20 |
| 16 | 100 | — | 25 | 1.5 | 0.5 | 16.7 | — | 200 | (0.027) | 2 | 0 |
| 17 | 100 | — | 25 | 1.5 | 0.5 | 16.7 | — | 200 | (0.027) | 2 | 10 |
| 18 | 100 | — | 25 | 1.5 | 0.5 | 16.7 | — | 200 | (0.027) | 2 | 20 |
| 19 | 100 | — | 25 | 1.5 | 0.5 | 16.7 | — | 200 | (0.027) | 3 | 0 |
| 20 | 100 | — | 25 | 1.5 | 0.5 | 16.7 | — | 200 | (0.027) | 3 | 10 |
| 21 | 100 | — | 25 | 1.5 | 0.5 | 16.7 | — | 200 | (0.027) | 3 | 20 |

| Ex. No. | Composition after alloying (wt. %) | | | | Heat resistance (weight gain) (%) | Workability (frequency of bending) | Overall judgment |
|---|---|---|---|---|---|---|---|
| | Ni | Fe | Cr | Al | | | |
| 10 | — | bal | 23 | 8 | 7 | 3 | ○ |
| 11 | — | bal | 24 | 7 | 7 | 3 | ○ |
| 12 | — | bal | 25 | 7 | 7 | 3 | ○ |
| 13 | — | bal | 22 | 6 | 8 | 6 | ○ |
| 14 | — | bal | 21 | 5 | 8 | 6 | ○ |
| 15 | — | bal | 21 | 5 | 8 | 6 | ○ |
| 16 | bal | — | 19 | 6 | 5 | 5 | ○ |
| 17 | bal | — | 19 | 6 | 5 | 5 | ○ |
| 18 | bal | — | 19 | 6 | 4 | 5 | ○ |
| 19 | bal | — | 23 | 6.5 | 4 | 5 | ○ |
| 20 | bal | — | 23 | 6.5 | 4 | 5 | ○ |
| 21 | bal | — | 25 | 6.5 | 4 | 5 | ○ |

*Remainder: $Al_2O_3$

EXAMPLES 22–27

Porous metal bodies (trade name: CELMET, nickel-base porous body of three-dimensional network structure, a product of Sumitomo Electric Industries, Ltd.) made by metallizing polyurethane by plating and having a skeleton size of 60 μm, a pore diameter of 0.7 mm, a packing density of 5% and a thickness of 1.8 mm and an porous metal body of iron were obtained. The thus obtained porous metal bodies were wound around a cylindrical core to form five-ply cylindrical porous bodies. Each body was uniformly pressed into a cylindrical sample having an inner diameter of 3 cm, an outer diameter of 4.2 cm and a height of 20 cm. As shown in FIG. 1, each sample was put on a diffusion gas source powdered material including Cr and $NH_4Cl$, based on the total weight of Cr, $NH_4Cl$ and $Al_2O_3$, as shown in Table 4, and spread on the bottom of a furnace (width: 17 cm, length: 23 cm and height: 25 cm) in a depth of about 2 cm. Chromizing was conducted in a gaseous atmosphere at 1050° C. for 5 hours.

Thereafter, the thus treated sample was taken out of the furnace and cut in square specimens (1 cm×1 cm). Each square specimen was peeled off, and analyzed for composition of the porous metal body alloyed with Cr by ionization absorption spectro-photometry. Each sample treated by chromizing was further subjected to heat resistance test. In this test, the heat resistance of the alloyed sample was evaluated by oxidizing the sample in the open air at 700° C. for 50 hours to determine the weight gain thereof. A case wherein the weight gain was up to 10% was judged good. The results are given in Table 4.

EXAMPLES 28–30

Nonwoven metal fabrics of nickel having a fiber diameter of 30 μm, packing density of 18% and a thickness of 0.7 mm were made by metallizing nonwoven fabrics made of organic fibers or carbon fibers with nickel by plating.

Each of the thus obtained nonwoven metal fabrics of nickel was wound around a cylindrical core to form a three-ply cylindrical porous body. Each body was uniformly pressed into a cylindrical sample having an inner diameter of 3 cm, an outer diameter of 3.3 cm and a height of 20 cm and alloyed with chromium by chromizing treatment in the same manner as described in Examples 22–24. The treatment was conducted in a gaseous atmosphere at 1050° C. for 3 hours. Thereafter, the thus treated metallized nonwoven fabric was subjected to compositional analysis and heat resistance test in the same testing procedures as described in Examples 22–24. The results are given in Table 5.

EXAMPLES 31–33

The same treatments as that of Examples 28–30 were repeated except that hydrogen gas and argon gas were introduced at rates of 240 cc/min and 60 cc/min, respectively, in place of the reducing diluent gas used in Examples 28–30; so that the flow rate (mol/min) of the reducing gas ($H_2$) per 1 kg of Cr was changed as shown in Table 5. The results are given in Table 5.

TABLE 4

| Ex. No. | Composition (wt. %) | | Composition of powdered material (wt. %)* | | | | Reducing diluent gas (cc/min) | | | Heat cycle | Distance from source material (cm) |
|---|---|---|---|---|---|---|---|---|---|---|---|
| | Ni | Fe | Cr | Al | $NH_4Cl$ | Cr/Al | Ar | $H_2$ | (mol/min) | | |
| 22 | — | 100 | 30 | — | 0.5 | — | — | 200 | (0.023) | 1 | 0 |
| 23 | — | 100 | 30 | — | 0.5 | — | — | 200 | (0.023) | 1 | 10 |
| 24 | — | 100 | 30 | — | 0.5 | — | — | 200 | (0.023) | 1 | 20 |
| 25 | 100 | — | 20 | — | 0.5 | — | — | 200 | (0.034) | 1 | 0 |
| 26 | 100 | — | 20 | — | 0.5 | — | — | 200 | (0.034) | 1 | 10 |
| 27 | 100 | — | 20 | — | 0.5 | — | — | 200 | (0.034) | 1 | 20 |

| Ex. No. | Composition after alloying (wt. %) | | | | Heat resistance (weight gain) (%) | Workability (frequency of bending) | Overall judgment |
|---|---|---|---|---|---|---|---|
| | Ni | Fe | Cr | Al | | | |
| 22 | — | bal | 28 | — | 8.75 | 7 | o |
| 23 | — | bal | 22 | — | 9.0 | 7 | o |
| 24 | — | bal | 20 | — | 10.0 | 8 | o |
| 25 | bal | — | 24 | — | 9.5 | 7 | o |
| 26 | bal | — | 21 | — | 9.3 | 7 | o |
| 27 | bal | — | 20 | — | 10.0 | 8 | o |

*Remainder: $Al_2O_3$

COMPARATIVE EXAMPLES 7–9

The same treatments as that of Examples 28–30 were repeated except that only argon gas was introduced at rate of 200 cc/min in place of the reducing diluent gas used in Examples 28–30. The results are given in Table 5.

TABLE 5

| | Composition (wt. %) | | Composition of powdered material (wt. %)* | | | | Reducing diluent gas (cc/min) | | | Heat cycle | Distance from source material (cm) |
|---|---|---|---|---|---|---|---|---|---|---|---|
| | Ni | Fe | Cr | Al | NH₄Cl | Cr/Al | Ar | H₂ | (mol/min) | | |
| Ex. No. | | | | | | | | | | | |
| 28 | 100 | — | 30 | — | 0.5 | — | — | 200 | (0.023) | 1 | 0 |
| 29 | 100 | — | 30 | — | 0.5 | — | — | 200 | (0.023) | 1 | 10 |
| 30 | 100 | — | 30 | — | 0.5 | — | — | 200 | (0.023) | 1 | 20 |
| 31 | 100 | — | 30 | — | 0.5 | — | 60 | 240 | (0.027) | 1 | 0 |
| 32 | 100 | — | 30 | — | 0.5 | — | 60 | 240 | (0.027) | 1 | 10 |
| 33 | 100 | — | 30 | — | 0.5 | — | 60 | 240 | (0.027) | 1 | 20 |
| Comparative Examples | | | | | | | | | | | |
| 7 | 100 | — | 30 | — | 0.5 | — | 200 | — | — | 1 | 0 |
| 8 | 100 | — | 30 | — | 0.5 | — | 200 | — | — | 1 | 10 |
| 9 | 100 | — | 30 | — | 0.5 | — | 200 | — | — | 1 | 20 |

| | Composition after alloying (wt. %) | | | | Heat resistance (weight gain) (%) | Workability (frequency of bending) | Overall judgment |
|---|---|---|---|---|---|---|---|
| | Ni | Fe | Cr | Al | | | |
| Ex. No. | | | | | | | |
| 28 | bal | — | 33 | — | 8.50 | 7 | ○ |
| 29 | bal | — | 27 | — | 8.75 | 7 | ○ |
| 30 | bal | — | 25 | — | 9.5 | 7 | ○ |
| 31 | bal | — | 32 | — | 8.50 | 7 | ○ |
| 32 | bal | — | 26 | — | 9.5 | 7 | ○ |
| 33 | bal | — | 25 | — | 9.5 | 7 | ○ |
| Comparative Examples | | | | | | | |
| 7 | bal | — | 10 | — | 18.0 | 8 | x |
| 8 | bal | — | 0.5 | — | 20.5 | 8 | x |
| 9 | bal | — | 0.2 | — | 22.5 | 8 | x |

*Remainder: Al₂O₃

EXAMPLES 34–36

The same treatments as that of Examples 25–27 were repeated except that the chromium concentration of the diffusion gas source powdered material was changed to 15% by weight and hydrogen gas was introduced at a rate of 280 cc/min in place of the reducing diluent gas used in Examples 25–27 so that the flow rate (mol/min) of the reducing gas (H₂) per 1 kg of Cr was changed as shown in Table 6. The results are given in Table 6.

EXAMPLES 37–39

The same treatments as that of Examples 28–30 were repeated except that hydrogen gas and argon gas were introduced at rates of 100 cc/min and 100 cc/min, respectively, in place of the reducing diluent gas used in Examples 28–30 so that the flow rate (mol/min) of the reducing gas (H₂) per 1 kg of Cr was changed as shown in Table 6. The results are given in Table 6.

TABLE 6

| Ex. No. | Composition (wt. %) | | Composition of powdered material (wt. %)* | | | | Deducing diluent gas (cc/min) | | (mol/min) | Heat cycle | Distance from source material (cm) |
|---|---|---|---|---|---|---|---|---|---|---|---|
| | Ni | Fe | Cr | Al | NH₄Cl | Cr/Al | Ar | H₂ | | | |
| 34 | 100 | — | 15 | — | 0.5 | — | — | 280 | (0.055) | 1 | 0 |
| 35 | 100 | — | 15 | — | 0.5 | — | — | 280 | (0.055) | 1 | 10 |
| 36 | 100 | — | 15 | — | 0.5 | — | — | 280 | (0.055) | 1 | 20 |
| 37 | 100 | — | 30 | — | 0.5 | — | 100 | 100 | (0.011) | 1 | 0 |
| 38 | 100 | — | 30 | — | 0.5 | — | 100 | 100 | (0.011) | 1 | 10 |
| 39 | 100 | — | 30 | — | 0.5 | — | 100 | 100 | (0.011) | 1 | 20 |

| Ex. No. | Composition after alloying (wt. %) | | | | Heat resistance (weight gain) (%) | Workability (frequency of bending) | Overall judgment |
|---|---|---|---|---|---|---|---|
| | Ni | Fe | Cr | Al | | | |
| 34 | bal | — | 18 | — | 10.0 | 8 | ○ |
| 35 | bal | — | 17 | — | 10.0 | 8 | ○ |
| 36 | bal | — | 16 | — | 10.0 | 8 | ○ |
| 37 | bal | — | 26 | — | 8.9 | 7 | ○ |
| 38 | bal | — | 22 | — | 9.0 | 7 | ○ |
| 39 | bal | — | 20 | — | 10.0 | 8 | ○ |

*Remainder: Al₂O₃

According to the present invention, as described above, the pressure of the aluminum vapor generated from the powdered material is lowered to increase the pressure of the chromium vapor relatively to that of the aluminum vapor, by which the deposition of excess aluminum onto a porous metal body can be inhibited and the concentrations of aluminum and chromium can be highly uniformed throughout the entire treatment atmosphere. By virtue of these effects, a porous metal body can be alloyed with aluminum and chromium uniformly throughout the entire thereof, even when it has a complicated shape or a relatively large size. Accordingly, the present invention enables the improvement of a porous metal body in heat and corrosion resistances without generating an area deteriorated in toughness by excess alloying with aluminum or chromium.

Further, according to the present invention, the concentrations of the component gases to be diffused and permeated into a porous metal body can be uniformed throughout the entire heat treatment atmosphere, by which a porous metal body to be treated can be alloyed with chromium uniformly throughout the entire thereof even when it has a complicated shape or a relatively large size. Therefore, the present invention enables the improvement of porous metal body in heat and corrosion resistances without generating an area deteriorated in toughness by excess alloying with chromium.

What is claimed is:

1. A process for the production of a heat- and corrosion-resistant porous metal body having at least a surface layer of metal, said process comprising placing said body on or apart from a powder, said body not being embedded in said powder, said powder comprising NH₄Cl and chromium and/or a chromium compound in an amount of 15% to 35% by weight, calculated as chromium and based on said powder, heating said powder and said body to 800° 1100° C. in a heating zone in the presence of a mixed gas comprising a generated gas and a reducing diluent gas, said generated gas resulting from heating said powder to 950° C. to 1100° C., and said reducing diluent gas being flowed into said heating zone substantially throughout said heating in an amount of 0.01 to 0.06 mol/min per 1 kg. in terms of Cr, of said chromium or chromium compound.

2. A process as set forth in claim 1, wherein at least two runs of a heat cycle comprising temperature rise and temperature fall are included in said heating of said powder and said body.

3. A process as set forth in claim 1, wherein the reducing diluent gas is hydrogen.

4. A process as set forth in claim 1, wherein the reducing diluent gas is a mixed gas consisting of hydrogen and an inert gas.

5. A process as set forth in claim 1, wherein the heat treatment time is 3 to 8 hours.

* * * * *